(12) United States Patent
Heuvel et al.

(10) Patent No.: US 7,326,013 B2
(45) Date of Patent: Feb. 5, 2008

(54) SUPPORT STRUCTURE APPARATUS AND METHOD

(75) Inventors: John Scott Heuvel, Johnson, IA (US); Douglas E. Colclasure, Aurora, IL (US); Robert J. Hassey, Union Grove, WI (US); Thomas A. Holmes, Dekalb, IL (US); Ordean F. Johnson, Alleman, IA (US); John G. Nanna, Lake Geneva, WI (US); Craig R. Wagenbach, Burlington, IA (US)

(73) Assignee: The Cretex Companies, Inc., Elk River, MN (US)

( * ) Notice: Subject to any disclaimer, the term of this patent is extended or adjusted under 35 U.S.C. 154(b) by 0 days.

(21) Appl. No.: 11/697,596

(22) Filed: Apr. 6, 2007

(65) Prior Publication Data

US 2007/0166119 A1  Jul. 19, 2007

Related U.S. Application Data

(62) Division of application No. 10/817,130, filed on Apr. 2, 2004, now Pat. No. 7,204,665.

(51) Int. Cl.
*B60P 7/08* (2006.01)
(52) U.S. Cl. .............................. 410/44; 410/45; 410/46
(58) Field of Classification Search .................. 410/44, 410/45, 46, 80, 156; 414/462, 812; 208/405.1; 248/688, 121
See application file for complete search history.

(56) References Cited

U.S. PATENT DOCUMENTS

| 1,519,319 | A | 12/1924 | Manning |
| 2,325,762 | A | 8/1943 | Ford |
| 2,377,023 | A | 5/1945 | Milburn et al. |
| 2,725,241 | A | 11/1955 | Leonard, Jr. |
| 2,808,288 | A | 10/1957 | Benson |
| 2,903,274 | A | 9/1959 | Leonard, Jr. |
| 3,154,207 | A | 10/1964 | Long |
| 3,168,771 | A | 2/1965 | Nelson |
| 3,232,636 | A | 2/1966 | Buchanan et al. |
| 3,402,904 | A | 9/1968 | Paraskewik |

(Continued)

FOREIGN PATENT DOCUMENTS

SU  1111913  9/1984

(Continued)

*Primary Examiner*—Stephen Gordon
(74) *Attorney, Agent, or Firm*—Michael Best & Friedrich LLP

(57) ABSTRACT

A support structure for supporting and tilting an oversized cargo to reduce the effective width of the cargo. The structure comprises a bolster frame having a base and a stanchion connected to the base. The stanchion extends upwardly from a lower end connected to the base to an upper end opposite the lower end. A cylindrical roller supported is by the upper end of the stanchion for rotational movement relative to the stanchion about a rotational axis. The cylindrical roller is also supported by the stanchion for pivotal movement relative to the stanchion such that the rotational axis pivots relative to the stanchion. The bolster frame also includes a bearing pad connected to the base. The cylindrical roller and the bearing pad at least partially support the oversized cargo. The support structure may be mounted on a trailer for transporting oversized cargo, such as concrete double-tees.

2 Claims, 9 Drawing Sheets

U.S. PATENT DOCUMENTS

| | | |
|---|---|---|
| 3,655,218 A | 4/1972 | Taylor |
| 4,024,820 A | 5/1977 | Hlinsky et al. |
| 4,244,682 A | 1/1981 | Willingham |
| 4,836,337 A | 6/1989 | Borrelli |
| 4,997,332 A | 3/1991 | Johnson |
| 5,683,213 A | 11/1997 | Baur et al. |
| 5,785,472 A | 7/1998 | Smith et al. |
| 5,909,989 A | 6/1999 | Baur et al. |
| 5,947,665 A | 9/1999 | Baur et al. |
| 5,957,350 A | 9/1999 | Giles |
| 6,047,989 A | 4/2000 | Wood |
| 6,334,746 B1 | 1/2002 | Nguyen et al. |
| 6,349,470 B1 | 2/2002 | Sasaki et al. |
| 6,428,047 B1 | 8/2002 | Kaderabek |
| 6,467,223 B1 | 10/2002 | Christley |
| H2061 H | 4/2003 | Tunnell |
| 6,848,880 B2 | 2/2005 | Erech et al. |
| 7,204,665 B2 * | 4/2007 | Heuvel et al. ............ 410/44 |

FOREIGN PATENT DOCUMENTS

| | | |
|---|---|---|
| SU | 1207850 | 1/1986 |

* cited by examiner

SUPPORT STRUCTURE APPARATUS AND METHOD

RELATED APPLICATIONS

This application is a divisional of and claims priority to U.S. patent application Ser. No. 10/817,130, filed on Apr. 2, 2004, and now issued as U.S. Pat. No. 7,204,665, which is hereby incorporated by reference.

FIELD OF THE INVENTION

This invention relates to an apparatus and method for supporting an oversized object.

BACKGROUND OF THE INVENTION

Many states or jurisdictions have laws that regulate the transportation of oversized or wide loads over public roadways. These laws generally provide a limit on the effective width of the load with respect to the surface of the road. Loads having an effective width greater than a certain distance may be subject to restrictions limiting when, where, or how the load may be transported. Oversized loads or cargo may also be subject to height restrictions during transportation. The actual limits may vary depending on jurisdiction. These restrictions may complicate the process of transporting an oversized load and result in a cost of additional time and satisfy the restrictions.

Prefabricated building sections, such as preformed concrete sections, are an example of an oversized load that is often transported. Pre-formed concrete sections are used in the construction industry to simplify and economize the building process. These pre-formed sections are often formed at a remote location away from a building site, and then transported to the building site to be assembled as part of the structure. One example of a pre-formed section is a concrete section commonly referred to as a "double-tee." A double-tee generally includes a flat deck and two support beam legs extending below the deck and along the length of the deck. The section is called a double-tee because the cross-sectional view of the section resembles two T's connected side-by-side. A double-tee may be used to construct structures such as parking ramps, bridges, floors, or other structures that may require a relatively strong and durable surface and a large amount of usable surface area. The width of many double-tees is often greater than the limits imposed by various jurisdictions for oversized or wide loads. Therefore, double-tees are often subject to various restrictions regarding the transportation of the loads.

SUMMARY OF THE INVENTION

The present invention provides a support structure for supporting and tilting an oversized load or cargo to reduce the effective width of the load or cargo. Some of the restrictions imposed on transporting an oversized load may be avoided if the effective width of the load is below the specified limit. The support structure is most effective for a relatively flat cargo, such as a concrete double-tee section, or a cargo in which the height and width dimensions are not similar. The support structure reduces the effective width of the cargo by tilting the cargo so the exceeding width dimension is positioned diagonally.

In some aspects and in some constructions, the support structure comprises a bolster frame having a base and a stanchion. The stanchion is connected to the base and extends upwardly from the base. The stanchion includes a lower end connected to the base and a upper end opposite the lower end. A cylindrical roller is supported by the upper end of the stanchion for rotational movement relative to the stanchion about a rotational axis. The cylindrical roller and stanchion at least partially support the cargo.

In some aspects and in some constructions, the stanchion comprises an opening near the upper end. The cylindrical roller, or trunion, includes a shaft extending through the opening and having a first end and a second end disposed on opposite sides of the stanchion. The cylindrical roller has a first roller connected to the first end of the shaft and a second roller connected to the second end of the shaft.

In some aspects and in some constructions, the cylindrical roller is supported by the stanchion for pivotal movement relative to the stanchion. The cylindrical roller may rotate about the rotational axis while the roller also pivots such that the rotational axis pivots relative to the stanchion. The roller may pivot in any radial direction with respect to the rotational axis. A roller bearing may connect the cylindrical roller to the stanchion for both rotational and pivotal movement relative to the stanchion.

In some aspects and in some constructions, the bolster frame includes a first bearing pad connected to the base for supporting the oversized cargo. The cargo rests on the bearing pad which at least partially supports the cargo. The bolster frame may also include second and third bearing pads that are removably connectable to the first bearing pad.

In some aspects and in some constructions, the support structure may be mounted on a trailer for transporting the oversized load or cargo. The trailer may include a bolster frame mounted near each end of the trailer. The cargo may tilted or supported by the bolster frames to reduce the effective width of the cargo relative to the cargo. With a reduced effective width, the cargo may be transported with fewer regulations or restrictions. The bolster frames may also be mounted to other transportation devices, such as rail cars, boats, or barges.

Independent features and independent advantages of the present invention will become apparent to those skilled in the art upon review of the following detailed description, claims and drawings.

Figure 1:
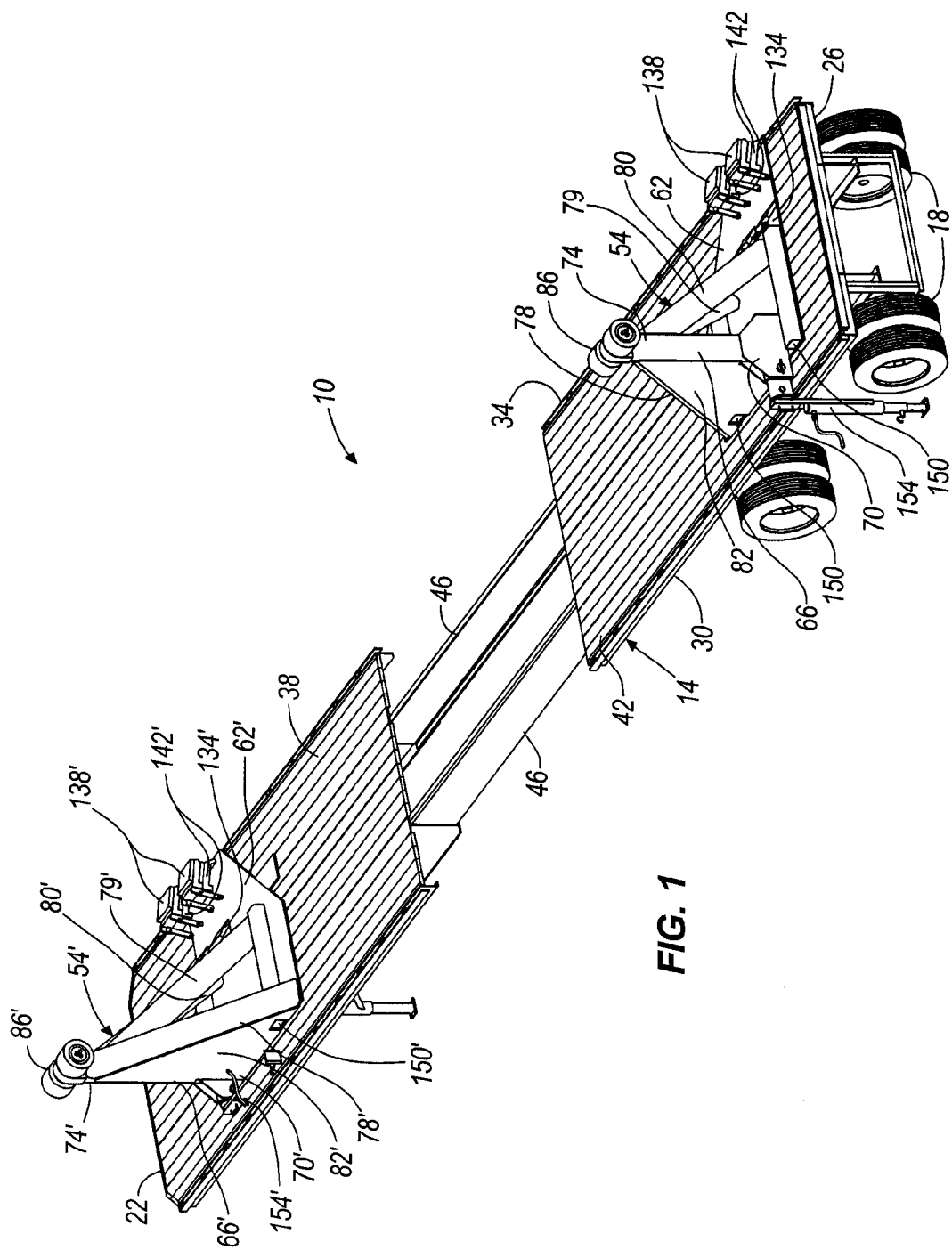
FIG. 1 is a perspective view of a trailer having a support frame embodying aspects of the present invention.

Before any embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

Although references may be made below to directions, such as left, right, up, down, top, bottom, front, rear, back, etc., in describing the drawings, these references are made relative to the drawings (as normally viewed) for convenience. These directions are not intended to be taken literally or limit the present invention in any form.

DETAILED DESCRIPTION

Figure 2:
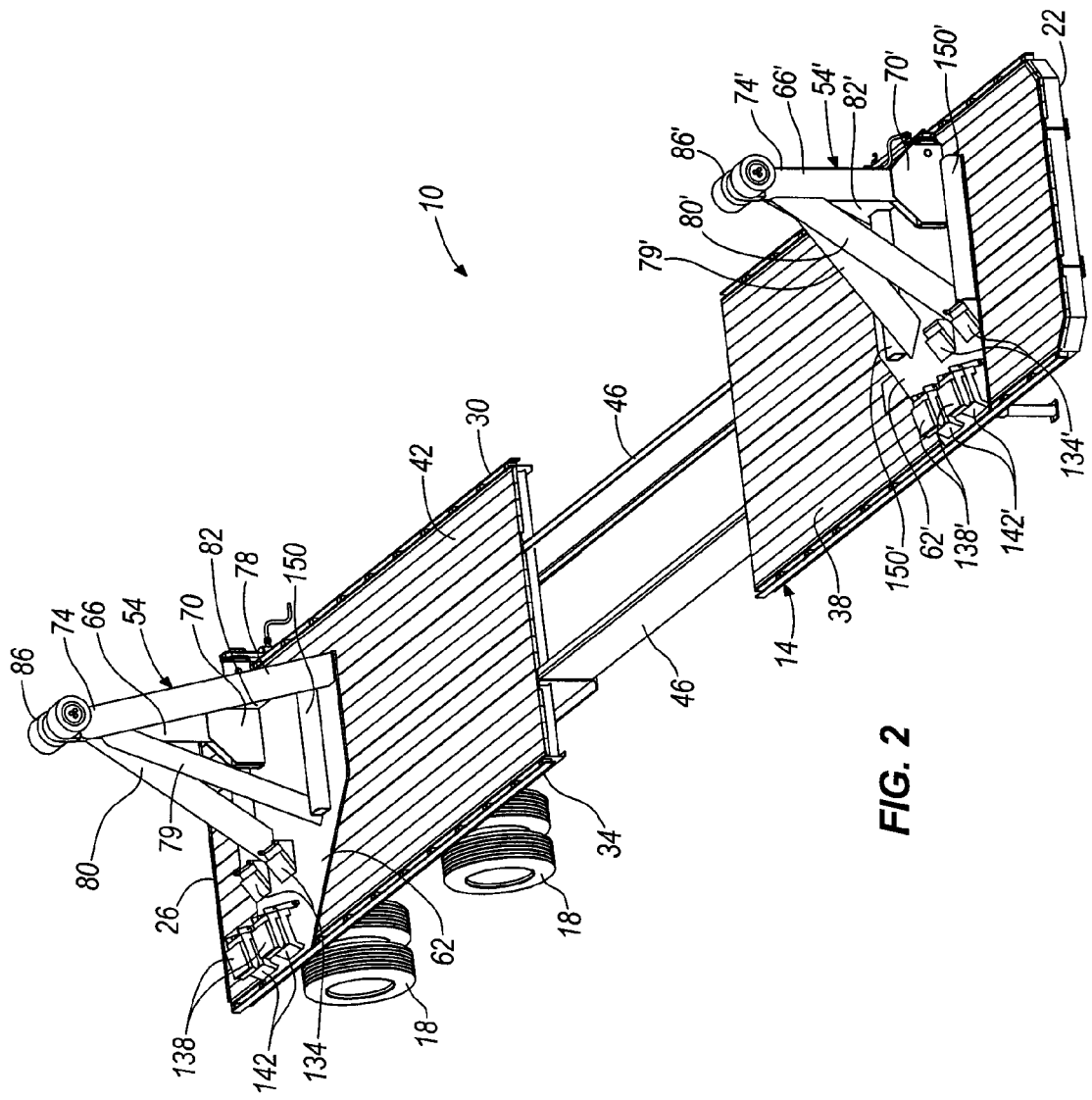
FIG. 2 is a perspective view of the trailer having the support frame of FIG. 1.
Figure 5:
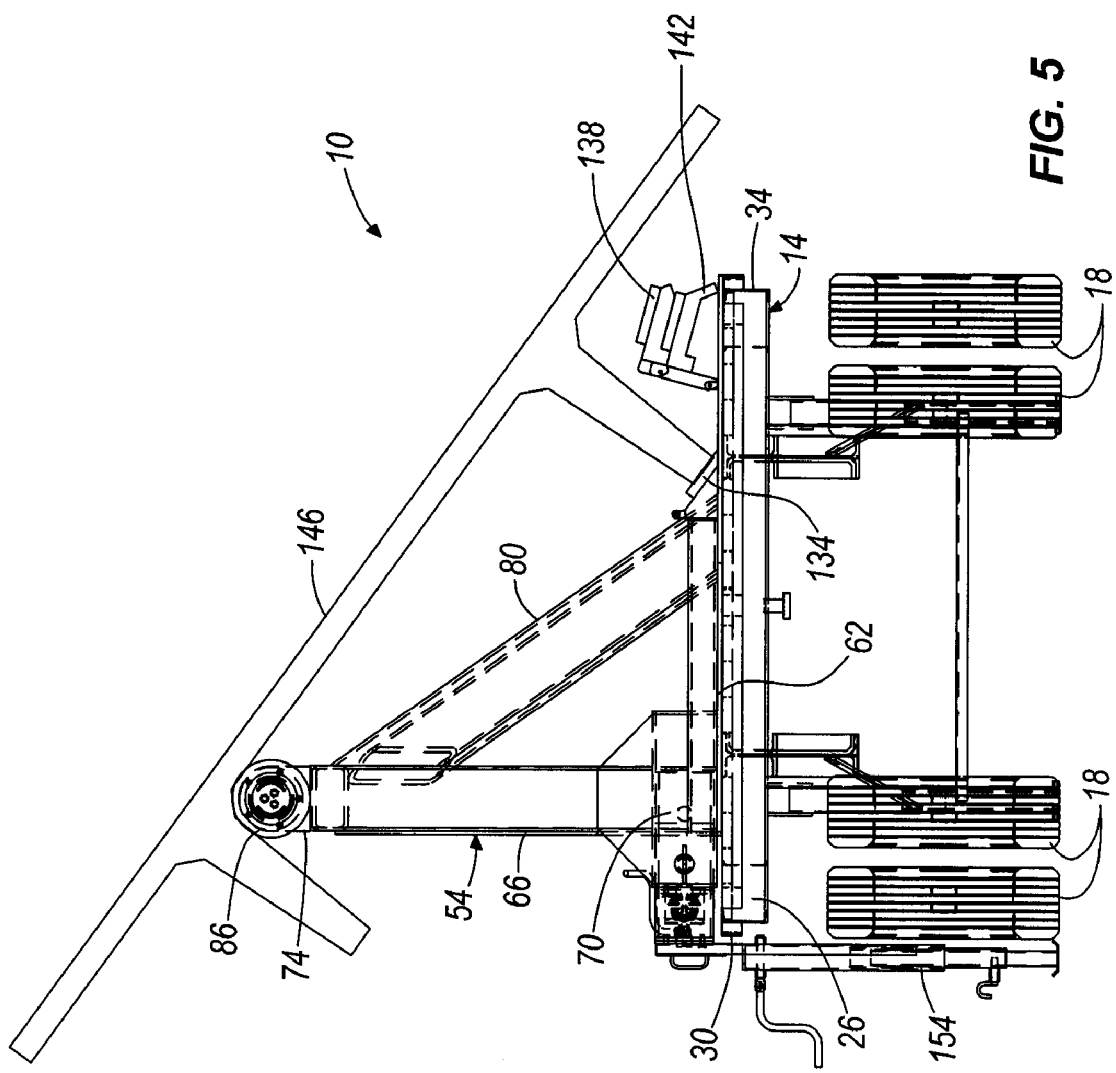
FIG. 5 is an end view of the trailer having the support frame of FIG. 1.

FIGS. 1-2 illustrate a truck trailer 10 for transporting an oversized object or cargo, such as a pre-formed concrete double-tee section (FIG. 5). The trailer 10 includes a trailer frame 14 and wheels 18 supporting the trailer frame 14, similar to a flatbed trailer, and is designed to be pulled by a semi tractor. In the illustrated construction, the trailer 10 includes a forward end 22 connectable to the tractor, and a rearward end 26 opposite the forward end 22. The trailer 10 extends in a longitudinal direction from the forward end 22 toward the rearward end 26 and has a length extending between the forward and rearward ends 22, 26. The trailer 10 also extends in a lateral direction from a first side 30 toward a second side 34 and has a width extending between the first and second sides 30, 34.

In the illustrated construction, the trailer frame 14 includes a platform having two separate platform portions, a forward portion 38 near the forward end 22 and a rearward portion 42 near the rearward end 26, with a gap between the portions 38, 42. Two beams 46 extend across the gap and connect the two portions 38, 42 to one another. The length of the beams 46 may be selected to lengthen the trailer 10 and may permit some flexibility for the trailer 10. In some aspects and in some constructions, the forward portion 38 and the rearward portion 42 may be combined to form a single platform. Additionally, in some aspects and in some constructions, the forward and rearward platform portions 38, 42 of the trailer 10 may not be necessary and the load may be supported on the trailer frame 14.

The trailer 10 includes a support structure for supporting the cargo on the trailer 10. In the illustrated construction, the support structure includes a first bolster frame 54 supported on the rearward portion 42 of the trailer frame 14 and a second bolster frame 54' supported on the forward portion 38 of the trailer frame 14. In some aspects and in some constructions, the support structure may include only a single bolster frame, or may also include more than two bolster frames. The first and second bolster frames 54, 54' are similar in construction except that they are substantially mirror images of one another. Only the first bolster frame 54 will be described in detail. Corresponding elements of the second bolster frame 54' have the same reference number but are denoted with an "'".

The bolster frame 54 includes a base 62 and a stanchion 66 extending upwardly from the base 62. The stanchion 66 is an upright post or support and includes a lower end 70 connected to the base 62 and an upper end 74 opposite the lower end 70. Multiple braces extend from the base 62 to the stanchion 66 to provide rigid support for the stanchion 66. In the illustrated construction, the bolster frame 54 includes a first, second and third brace 78, 79, 80 extending from spaced positions on the base 62 and rigidly connected to the stanchion 66 near the upper end 74. A triangular panel or gusset 82 is connected the stanchion 66, base 62 and first brace 78 to provide additional support for the stanchion 66. In the illustrated construction, the gusset 82 is rigidly connected to the first brace 78 near the first side 30 of the trailer frame 14.

The bolster frame 54 also includes a trunion 86 connected to the upper end 74 of the stanchion 66 for rotational movement relative to the stanchion 66. The trunion 86 is a generally cylindrical roller structure and is supported such that it can rotate a full 360 degrees about a rotational axis 90 (FIG. 4). The rotational trunion 86 facilitates loading a cargo onto the bolster frame 54 and removing a cargo from the bolster frame 54. The rolling movement of the cylindrical trunion 86, similar to a wheel, reduces friction and permits the cargo to roll into position after contacting the trunion 86. A method for loading a cargo onto the bolster frame 54 is described in greater detail below.

Figure 3:
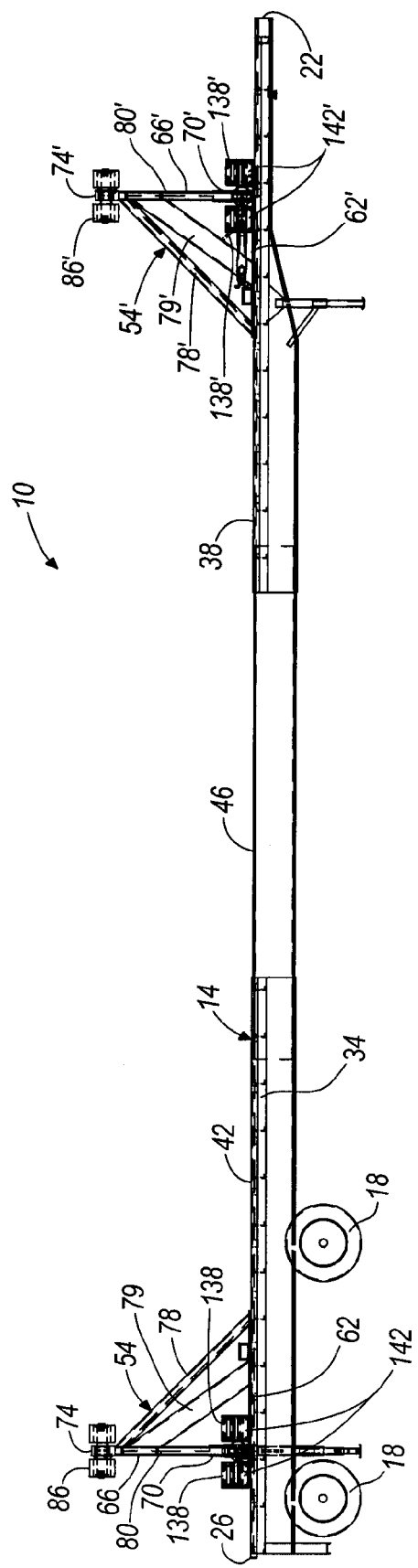
FIG. 3 is a side view of the trailer having the support frame of FIG. 1.

FIG. 3 illustrates an elevation view of the trailer 10 as shown from the side of the trailer 10 looking toward the second side 34 of the trailer 10. FIG. 3 shows the first bolster frame 54 connected to the rearward portion 42 the trailer frame 14 and the second bolster frame 54' connected to the forward portion 38 of the trailer frame 14. Both bolster frames 54, 54' extend upwardly about the same distance from the trailer frame 14.

Figure 4A:
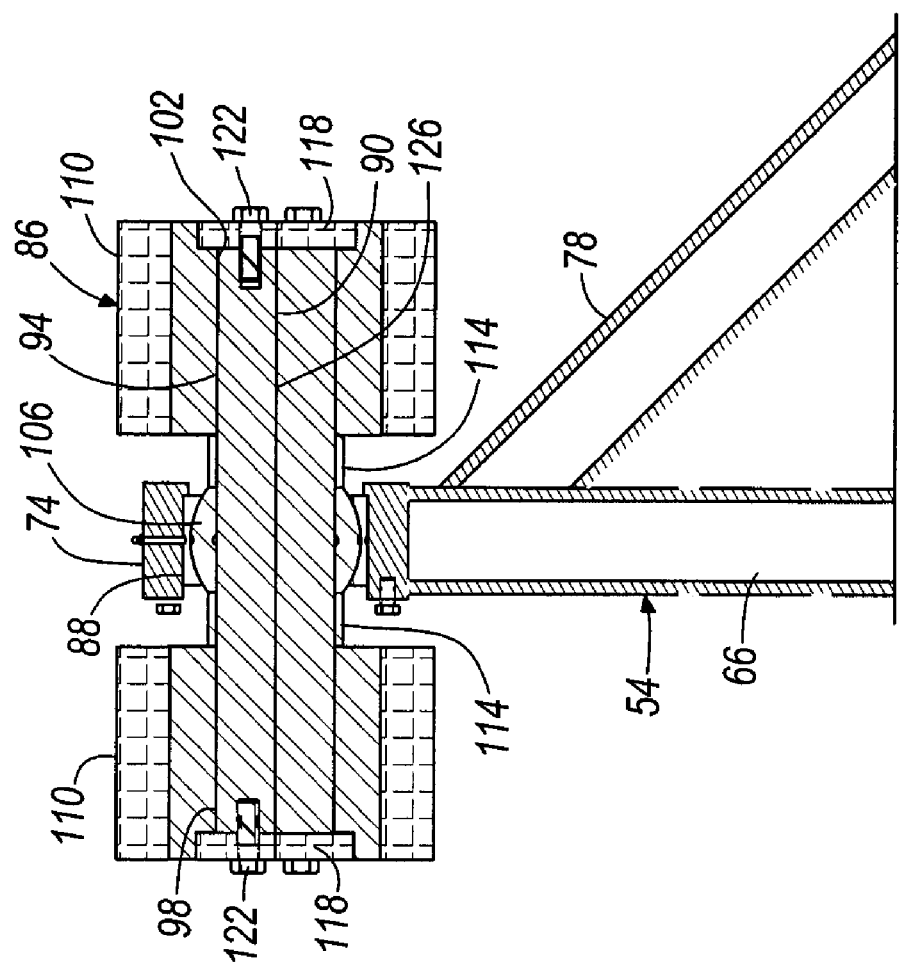
FIG. 4A is an enlarged view in cross-section of a portion of the trailer having the support frame of FIG. 1.
Figure 4B:
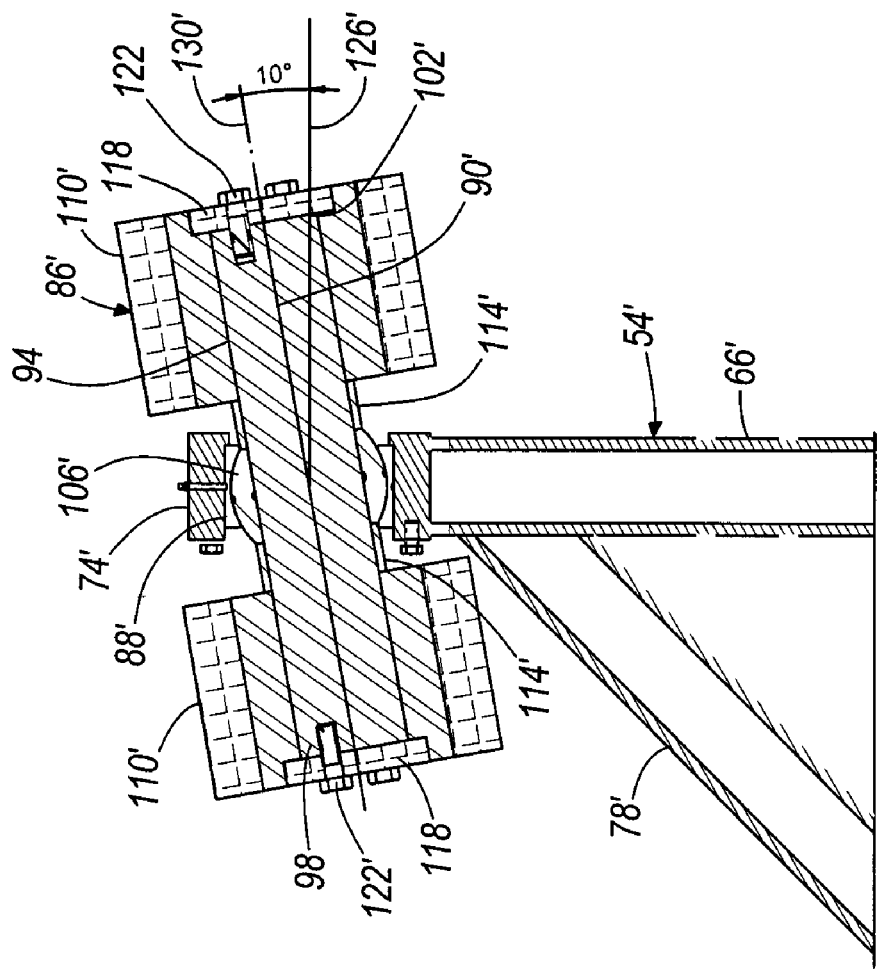
FIG. 4B is an enlarged view in cross-section of a portion of the trailer having the support frame of FIG. 1.

FIG. 4A illustrates an enlarged portion of the first bolster frame 54 including the first trunion 86, and FIG. 4B illustrates an enlarged portion of the second bolster frames 54' including the second trunion 86'. As shown in FIG. 4A, the stanchion 66 includes an opening 88 near the upper end 74. The trunion 86 includes a trunion shaft 94 having a first end 98 and a second end 102 opposite the first end 98 and extending through the opening 88. The first and second ends 98, 102 are disposed on opposite sides of the stanchion 66. A spherical bearing 106 rotationally connects the trunion shaft 94 to the stanchion 66 near a middle portion of the trunion shaft 94.

In the illustrated construction, the trunion 86 is generally dumb-bell shaped and includes a roller 110 connected to each end 98, 102 of the trunion shaft 94. The rollers 110 have a cylindrical shape and the radius of the rollers 110 extend beyond the upper end 74 of the stanchion 66 from the rotational axis 90. The rollers 110 contact the cargo and prevent the cargo from contacting the stanchion 66. The rollers 110 are preferably made from a strong, durable material, such as urethane, that can withstand the loads and repetitive wear and tear experienced by contact with the cargo.

The trunion 86 includes a sleeve 114 surrounding at least a portion of the trunion shaft 94 near the middle of the trunion shaft 94. The sleeve 114 may include two segments with each segment being positioned between the spherical bearing 106 and one of the rollers 110 to properly space the rollers 110 at a desired position on the trunion shaft 94. The trunion 86 also includes a retainer plate 118 at each end 98, 102 of the trunion shaft 94 to retain each respective roller 110 on the trunion shaft 94. Retainer bolts 122 may fasten the retainer plates to the ends 98, 102 of the trunion shaft 94. In some aspects and in some constructions, the rollers 110 may rotate freely about the trunion shaft 94 and the trunion shaft 94 may rotate relative to the stanchion 66.

The trunion 86 is also mounted to the stanchion 66 for pivotal movement about an axis generally perpendicular to the axis of rotation of the trunion shaft 94, in addition to rotational movement, relative to the stanchion 66. In the illustrated construction, the spherical bearing 106 rotationally and pivotally connects the trunion 86 to the stanchion 66. The spherical bearing 106 includes two mating rounded portions engaging one another. A first rounded portion is connected to the trunion shaft 94 and is generally spherically and has an at least partially convex cross-section, as shown in FIG. 4A. The second rounded portion is connected to the stanchion 66 and defines a rounded recess having an at least partially concave cross-section, as shown in FIG. 4A.

The trunion 86 is generally evenly balanced about the stanchion 66 in a rest condition when no loads are applied to the trunion 86. The trunion 86 is pivotable relative to the stanchion 66 from the rest condition to a limit condition that limits pivotable movement of the trunion 86. The trunion 86 may be pivoted or tilted to move from the rest condition to the limit condition. The rotational axis 90 of the trunion 86 generally defines a rest axis 126 when the trunion 86 is in the rest condition, and a limit axis 130' (FIG. 4B) when the trunion 86 is in the limit condition. In the illustrated construction, the rest axes 126, 126' for the trunions 86, 86' of both the first and second bolster frames 54, 54' are generally aligned with one another.

FIG. 4A illustrates the first bolster frame 54 having the trunion 86 in the rest condition, in which the rotational axis 90 defines the rest axis 126. FIG. 4B illustrates the second bolster frame 54' having the trunion 86' in the limit condition, in which the rotational axis 90' defines the limit axis 130'. The trunion 86 may rotate about the rotational axis 90' while the trunion 86' simultaneously pivots such that the rotational axis 90' pivots relative to the rest axis 126'.

As shown in FIG. 4B, the trunion 86' may pivot about 10 degrees from the rest axis 126' in any radial direction. The maximum angle for pivotal movement of the trunion 86' may vary and may be selected depending on the specific application of the bolster frame 54'. In some aspects and in some constructions, the spherical bearing 106' or the position of the brace 78' may determine the limit condition and the maximum angle for pivotal movement. In FIG. 4B, the limit axis 130' of the second trunion 86' forms about a 10 degree angle with the rest axis 126'. All the limit axes 130' extending entirely around the rest axis 126' in all radial directions from the rest axis 126' generally define a conical shape, and the trunion 86' is movable to substantially any orientation within that conical shape.

The pivotal movement of the trunion 86' permits the trunion 86' to facilitate loading the cargo on the bolster frame 54'. If the cargo is not perfectly aligned and contacts one end of the trunion 86' before contacting the other end, the trunion 86' will pivot or tilt in response to contact with the cargo to bring the free end of the trunion 86' toward the cargo. The movement of the trunion 86' aligns the trunion 86' with the cargo and increases contact with the cargo to help ease the double-tee into position.

In alternate constructions (not shown), the rollers 110 may be rotationally mounted to the trunion shaft 94 to permit rotation of the rollers 110 relative to the trunion shaft 94 as well as the stanchion 66. Roller bearings may be placed between each roller 110 and the respective end of the trunion shaft 94 to rotationally connect the elements. Additionally, the trunion shaft 94 may be fixed relative to the stanchion 66. In this construction, the rollers 110 may rotate with respect to the stanchion 66 while the trunion shaft 94 remains fixed relative to the stanchion 66.

In other alternate constructions (not shown), a stanchion may include a fork at the upper end having two prongs extending upwardly. A trunion shaft may extend between the fork structure with each end of the trunion shaft connected to one of the prongs. The trunion may include roller bearings to rotationally connect each end of the shaft to a respective prong. The trunion may include a roller connected to the middle portion of the trunion shaft between the prongs to rotate relative to the stanchion. Alternatively, the ends of the trunion shaft may be fixed or rigidly connected to the prongs, and the roller may be rotationally connected to the middle of the trunion shaft to rotate relative to the stanchion and/or the trunion shaft.

As shown in FIGS. 1-2, the bolster frame 54 includes bearing pads connected to the base 62 to support a portion of the double-tee. The bearing pads are preferably made from a strong and durable material to withstand the loads and wear and tear applied by contact with the cargo. In the illustrated embodiment, each bolster frame 54 includes two sets of bearing pads positioned adjacent one another. Each set of bearing pads include a first pad 134 fixed to the base 62 and second and third pads 138, 142 removably connectable to the base 62 and/or the first pad 134. The second and third pads 138, 142 are removably connectable to the first pad 134 to adjust the height of the bearing pads to accommodate different sized double-tees. The bearing pads may include a latch, lock pin, or some other similar fastening device to secure the second and third pads 138, 142 to the first pad 134.

FIGS. 1-2 illustrate the second and third pads 138, 142 removed from the first pad 134 and stowed in a storage condition. The second and third pads 138, 142 may be moved to a transport condition in which the pads 138, 142 are connected to the first pad 134. The storage condition for the second and third pads 138, 142 is near the first pad 134 for convenience, but yet far enough to provide clearance for the cargo to be pivoted into position in contact with the bearing pads in the transport condition. All the bearing pad sets are generally configured with the same number of pads 134, 138, 142 in each condition to provide substantially uniform surfaces to support the cargo and help evenly distribute the weight of the cargo.

FIGS. 5-8 illustrate a rear view of the trailer 10 supporting a cargo from behind the trailer 10 looking toward the rearward end 26. FIGS. 5-8 illustrate the cargo as a concrete double-tee 146 having a relatively flat deck and a left leg and a right leg extending downwardly from the deck. The size and dimensions of the double-tee 146 may vary depending on the intended application of the double-tee 146. Double-tees commonly have a width of about 15 feet, however, the length of the legs from the deck often varies. Three common lengths for the legs of double-tees are about 34 inches, about 30 inches, and about 24 inches.

The trunion 86 is elevated by the stanchion 66 and supports a raised side of the double-tee 146. The trunion 86 engages an inner corner of the double-tee 146 at an intersection of the deck and the left leg. The bearing pad 134 connected to the base 62 contacts a lower end of the right leg of the double-tee 146 and supports a lowered side of the double-tee 146. The adjustable or selectable bearing pads help position the double-tee 146 such that the center of gravity of the double-tee 146 is positioned over the center of the trailer.

FIG. 5 illustrates the trailer 10 supporting a double-tee 146 having relatively long legs, or about 34 inches. In FIG. 5, the second and third pads 138, 142 are positioned in the storage condition out of the way from the double-tee 146 while the first pad 134 remains in the transport condition. The trunion 86 contacts the internal corner at the intersection of the left leg and deck to support the raised side of the double-tee 146, and the first pad 134 contacts the end of the right leg to support the lowered side of the double-tee 146.

Only the first pad 134 may be needed with the illustrated double-tee 146 having relatively long legs.

Figure 6:
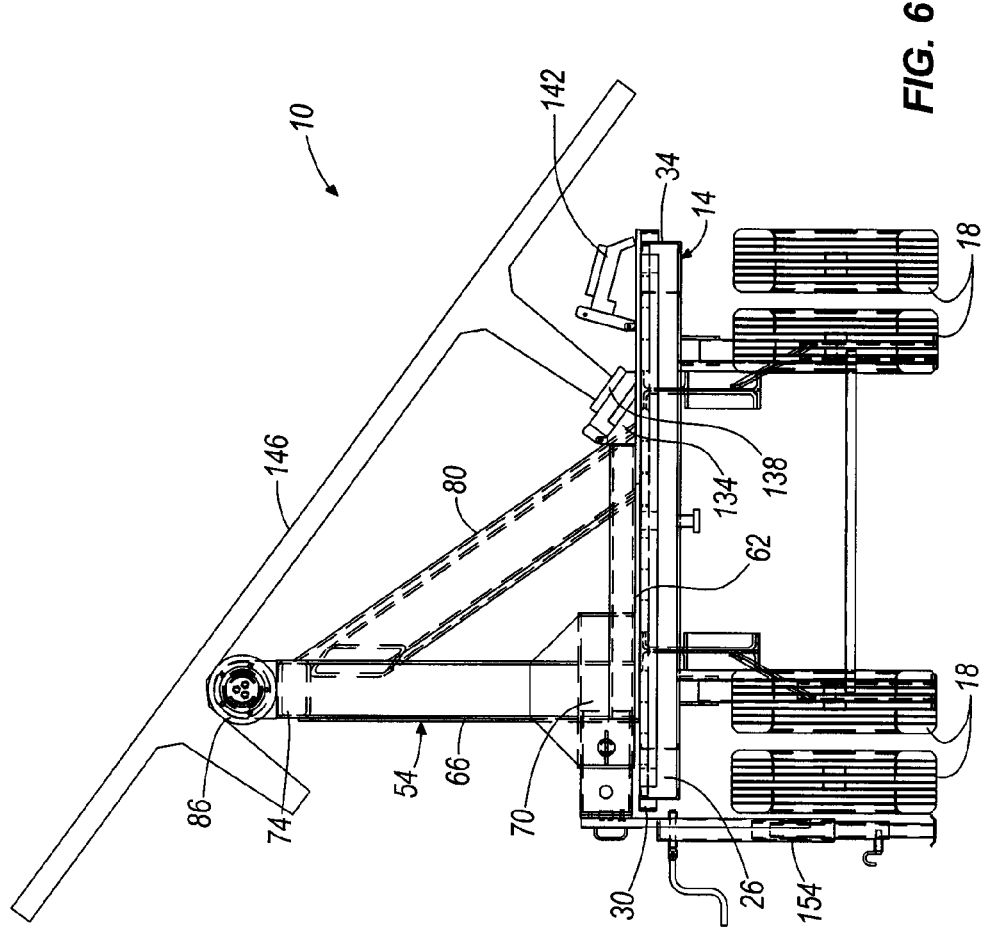
FIG. 6 is an end view of the trailer having the support frame of FIG. 1.

FIG. 6 illustrates the trailer 10 supporting a double-tee 146 having medium length legs, or about 30 inches. In FIG. 6, the third pad 142 is positioned in the storage condition out of the way from the double-tee 146, and the second pad 138 is connected to the first pad 134 in the transport condition. The trunion 86 supports the raised side of the double-tee 146, and the second pad 138 contacts the end of the right leg to support the lowered side of the double-tee 146. Both the first and second pads 134, 138 may be needed to position the illustrated double-tee 146 having medium length legs.

Figure 7:
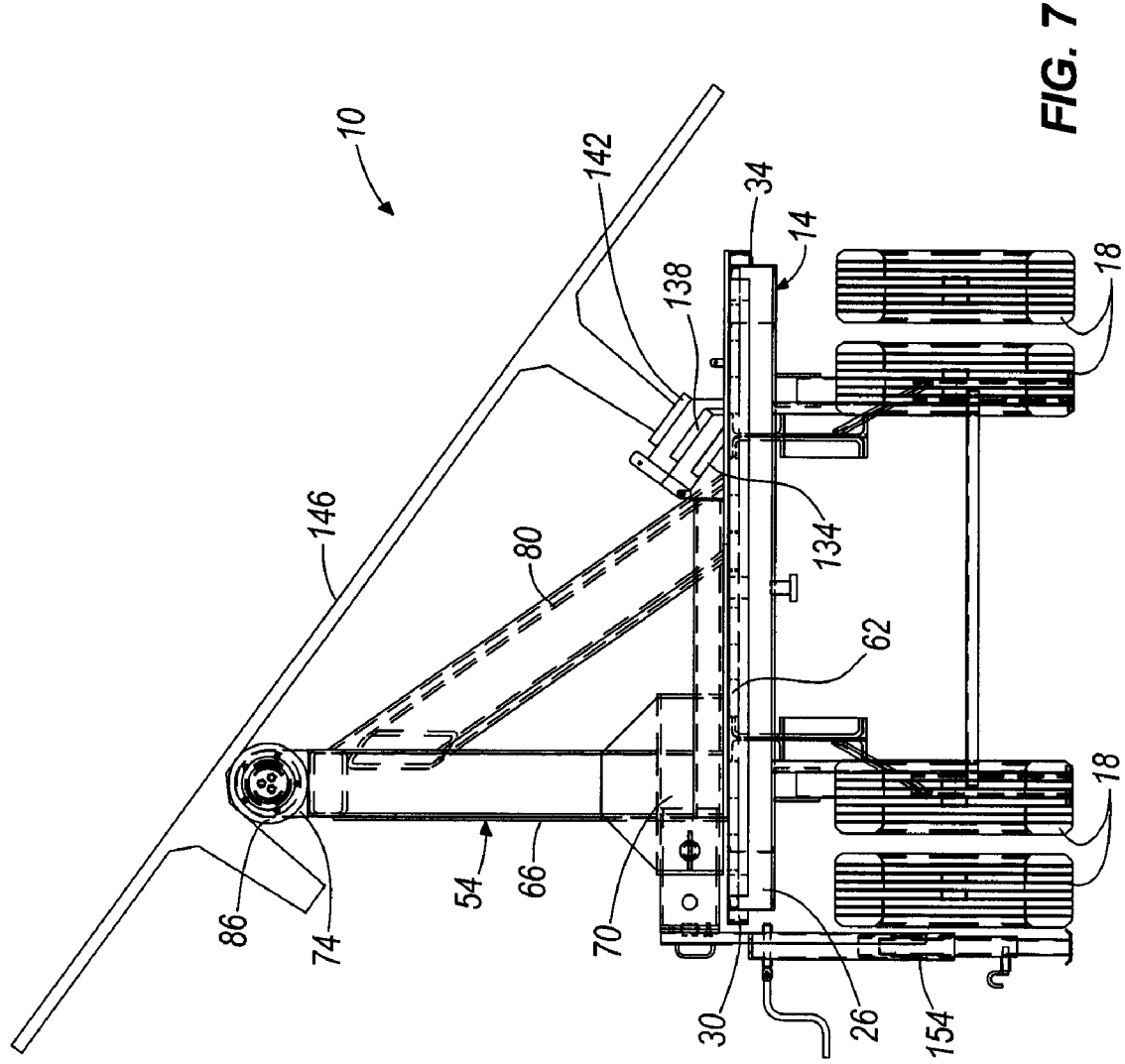
FIG. 7 is an end view of the trailer having the support frame of FIG. 1.

FIG. 7 illustrates the trailer 10 supporting a double-tee 146 having relatively short legs, or about 24 inches. In FIG. 7, both the second and third pads 138, 142 are connected to the first pad 134 in the transport condition, and none of the pads are positioned in the storage condition. The trunion 86 supports the raised side of the double-tee 146, and the third pad 142 contacts the end of the right leg to support the lowered side of the double-tee 146. The first, second and third pads 134, 138, 142 may be needed to position the illustrated double-tee 146 having relatively short legs.

In other aspects and in other constructions (not shown), other numbers of pads may also be included with the bearing pads. For example, the bearing pads could only include a single pad, two pads, or four or more pads. Additionally, other means of adjusting the height of the bearing pads may be used. For example the bearing pads could include a jack-screw, a hydraulic or pneumatic lift, or other similar height adjustment mechanisms for raising or lowering the bearing pads.

In the illustrated construction, the bolster frames 54, 54' are removably connected to the trailer frame 14. The bolster frames 54, 54' may be positioned at a desired location with respect to the trailer frame 14 depending on the size of the load to be carried. It is generally desirable to position the center of gravity of the load near the midpoint, or center of the width, of the trailer 10, or about half-way between the wheels 18. The center of gravity and midpoint of the trailer 10 are described in greater detail below. Various fastening means, such as bolts, pins, latches, or clamps may be used to connect the bolster frames 54, 54' to the trailer frame 14. In some aspects and in some constructions, the bolsters may be permanently connected to the trailer frame 14 through welding, or other similar permanent fastening means, to create a dedicated trailer 10 for transporting oversized cargo. In some aspects and in some constructions, the trailer 10 may include a trailer frame, and the bolster frames 54, 54' may be connected directly to the trailer frame.

In some aspects and in some constructions (not shown), the length of the stanchion 66 may be adjustable to vary the height of the trunion 86 relative to the base 62. The stanchion 66 may include a telescoping tubular configuration, in which an inner shaft is at least partially disposed within an outer shaft, and the inner shaft may be moved relative to the outer shaft to adjust the height of the stanchion 66. A locking device, such as a pin, clamp, collet, or block, may be used to secure the inner shaft with respect to the outer shaft. Since the trunion 86 provides the highest support point of the support structure, adjusting the height of the trunion 86 will adjust the angle the double-tee 146 is positioned relative to the trailer frame 14. Also, adjusting the height may further reduce the effective width of the double-tee 146 even if necessary.

In alternate constructions (not shown), the stanchion 66 may include interchangeable end portions that may be connected to the upper end of the stanchion 86 and support the trunion 86. For example, a first end portion may have a first length and may be connected to the stanchion 66 to provide a first height for the trunion 86. The first end portion may the be removed from the stanchion 66 and a second end portion having a second length may be connected to the stanchion 66 to provide a second height for the trunion 86 greater than the first height. Therefore, each interchangeable end portion may provide a different height for the trunion 86 to accommodate double-tees 146 of different sizes.

When the orientation of the double-tee 146 relative to the trailer frame 14 is adjusted, the center of gravity of the double-tee 146 with respect to the center of the trailer may also be adjusted. In some aspects and in some constructions, the bolster frame 54 may be adjusted laterally with respect to the trailer frame 14 to position the center of the gravity over the center of the trailer. The bolster frame 54 may be disconnected from the trailer frame 14, adjust to the desired position, and reconnected to the trailer frame 14 to laterally adjust the bolster frame 54.

As shown in FIGS. 1-2, the bolster frame 54 may include fork pockets 150 built into the base 62 to facilitate movement of the bolster frame 54 with respect to the trailer frame 14. The fork pockets 150 are generally elongated tubular passages defined by the base 62, and are designed to receive the forks of a fork-lift device. For example, after the bolster frame 54 has been disconnected from the trailer frame 14, the forks of a fork-lift may be inserted into the fork pockets 150 and the fork-lift may raise the bolster frame 54 from the trailer frame 14. The bolster frame 54 may then be repositioned on the trailer frame 14, or removed from the trailer frame 14 altogether. The bolster frame 54 is generally made from a very strong durable, heavy material, such as steel, and is not easily moved by hand. The fork pockets 150 help provide an simplified way to adjust the position of the bolster frame 54 with respect to the trailer frame 14.

FIGS. 1-2 also illustrate an outrigger 154 connected to the bolster frame 54. The outrigger 154 is movably connected to the bolster frame 54 near the lower end 70 of the stanchion 66. The outrigger 154 is basically an extendable jack device to provide stability for the trailer 10 during loading or unloading of the double-tee 146 or cargo. When the double-tee is loaded or unloaded from the support structure, the shifting of the double-tee may exert lateral loads on the trailer 10. The outrigger 154 provides lateral stability and helps the trailer 10 withstand these lateral loads and. The outrigger 154 is movable between a loading condition, in which the outrigger 154 may extend to contact the ground, and a travel condition, in which the outrigger 154 is stowed out of the way to permit movement of the trailer 10. As shown in FIG. 1, the first bolster frame 54 has the outrigger 154 in the loading condition, and the second bolster frame 54' has the outrigger 154' in the travel condition. In the illustrated construction, the outrigger 154 is a screw-jack, but may also be a hydraulic or pneumatic jack, or other similar jack device.

Loading and unloading a double-tee 146 on the support structure is not always a precise procedure. The double-tee 146 is a relatively large object, sometimes measuring about 15 feet wide by about 60 feet long and weighing about 66,000 pounds, and is often lowered onto the bolster frame 54 with a crane. Some double-tees 146 may weigh as much as about 100,000 pounds. When supported by the crane, the double-tee 146 may move due to various factors, such as wind or change in momentum, thereby shifting the load in the air. While being lowered, the double-tee 146 is generally first positioned with the deck generally parallel to the ground, or trailer frame, while being lowered onto the bolster frame 54.

Figure 8:
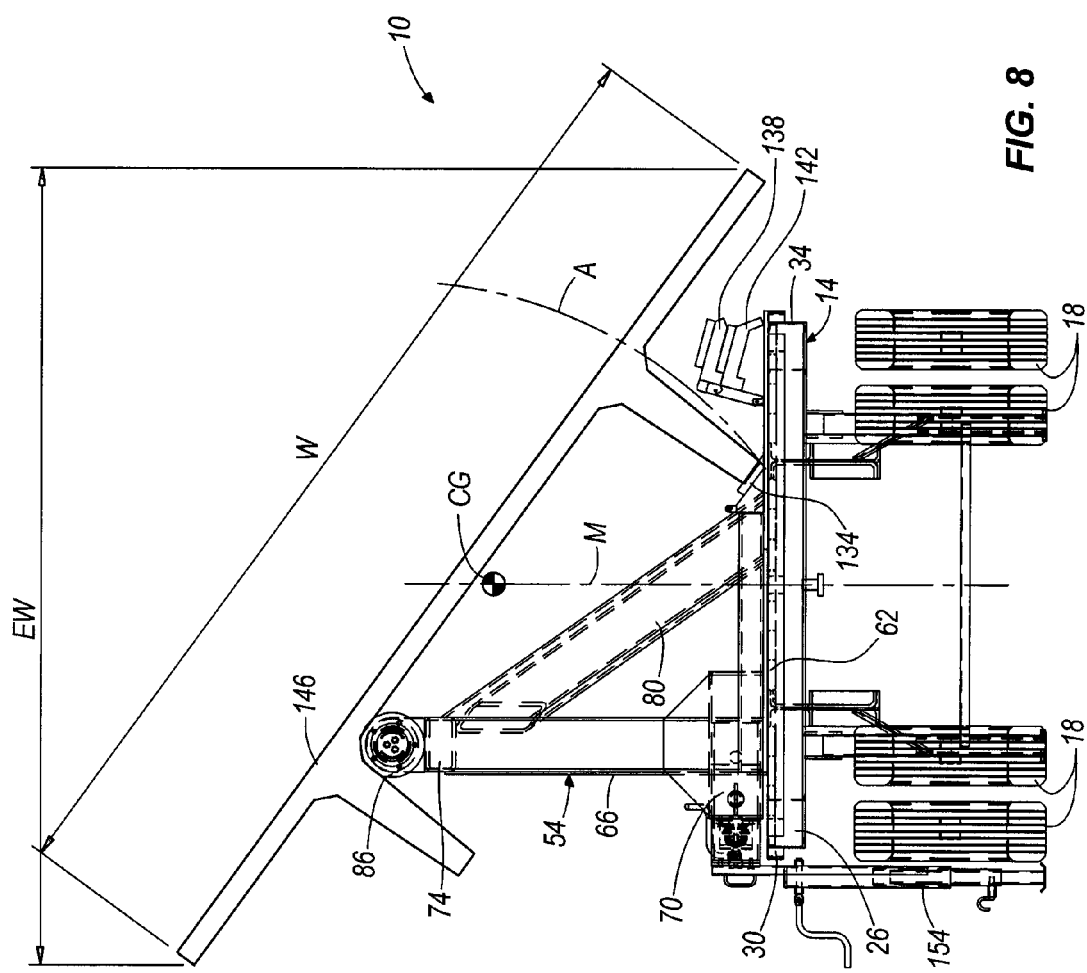
FIG. 8 is an end view of the trailer having the support frame of FIG. 1.

FIG. 8 illustrates the double-tee 146 positioned on the trailer 10. The double-tee 146 is generally lowered with the trunion 86 positioned between the legs of the double-tee 146. The trunion 86 is the highest point on the trailer 10, and is generally the first part the double-tee 146 contacts as it is lowered into position. Once the double-tee 146 contacts the trunion 86, the double-tee 146 rolls along the trunion 86 as the trunion 86 rotates. The trunion 86 is then positioned adjacent the internal corner of the double-tee 146, near the intersection of the left leg and the deck.

The trunion 86 supports the left, or raised side, of the double-tee 146 while the double-tee 146 is continually lowered onto the bolster frame 54. Once the trunion 86 is positioned at the internal corner of the double-tee 146, the double-tee 146 will pivot downwardly about the trunion 86 while the right side of the double-tee 146 is lowered. The arc (A) illustrates the path of the lower end of the right leg as the double-tee 146 pivots downwardly. The trunion 86 remains in contact with the double-tee 146 and rotates about the rotational axis relative to the stanchion 66. The double-tee 146 continues to pivot downwardly until the lower end of the right leg contacts the bearing pad 134 and the double-tee 146 comes to rest. After the double-tee 146 is lowered into place, additional fasteners may be used to secure the double-tee 146 to the trailer 10, such as chains, ropes, straps, clamps, rails, or other similar fasteners.

Positioning the double-tee on the trailer 10 reduces the effective width of the double-tee 146 with respect to the road or surface on which the trailer 10 is traveling. The double-tee 146 includes a width (W) extending between the sides of the double-tee 146. The effective width (EW) is the space the double-tee 146 takes up above the road and is generally measured in a plane substantially parallel to the road or surface. For example, the double-tee 146 shown in FIG. 8 has a deck with an overall width (W) of about 15 feet, which represents the distance between the two sides of the double-tee 146. When positioned on the bolster frames 54, the effective width (EW) of the double-tee 146 is about 12 feet 4 inches.

FIG. 8 illustrates a center of gravity (CG) of the double-tee 146 positioned below the deck and between the legs of the double-tee 146, and illustrates the midpoint (M) of the trailer 10 as a vertical line extending upwardly from a point half way between the outer edges of the wheels 18. In the illustrated construction, the bolster frame 54 positions the center of gravity (CG) of the double-tee 146 substantially over the midpoint (M) of the trailer 10. While it is not necessary to have the center of gravity (CG) perfectly aligned with the midpoint (M), positioning the center of gravity (CG) of the double-tee 146 near the midpoint (M) of the trailer 10 does help stabilize the load for transport on the trailer 10.

In the illustrated construction, the stanchion 66 and trunion 86 are positioned near the first side 30, or left side, of the trailer 10. The illustrated construction is intended for use in regions in which vehicles travel on the right side of the road and the left side of the vehicle is the inner side on the roadway. In this construction, the raised side of the double-tee is on the inner side of the trailer 10 and the lowered side of the double-tee is on the outer side of the trailer 10. Therefore, the raised side of the double-tee is viewable by oncoming traffic on the opposite side of the road and provides additional clearance for the oncoming traffic. The raised side is generally less intimidating for an oncoming driver than the lowered side.

In some aspects and in some constructions, the bolster frame 54 may be reversed with respect to the trailer frame 14, with the stanchion 66 and trunion 86 positioned near the right side of the trailer 10 instead of the left, as shown in FIG. 8. In this construction, the raised side of the double-tee would be on the right side of the trailer 10 and the lowered side of the double-tee is on the left side of the trailer 10. This construction may be desirable in regions where vehicles travel on the left side of the road.

In the illustrated construction, the support structure and bolster frame 54 are mounted on the trailer 10 for transportation and use with a semi tractor. In other aspects and in other constructions, the support structure and bolster frame 54 could also be mounted on other means of transportation, such as train cars, boats, barges, sleds, or other similar devices. The bolster frame 54 could also be used to for stationary storage of the double-tee or other oversized objects. It should be understood that while the figures illustrate the structure supporting a double-tee, the support structure and bolster frame 54 may also support other oversized cargo.

The foregoing detailed description describes only a few of the many forms that the present invention can take, and should therefore be taken as illustrative rather than limiting. It is only the claims, including all equivalents that are intended to define the scope of the invention.

What is claimed is:

1. A method for loading a concrete double-tee having a deck and at least two legs onto a support structure having a rotational cylindrical roller supported on a stanchion, the method comprising the acts of:
   lowering the double-tee toward the support structure, the stanchion being positioned between the legs of the double-tee;
   positioning the cylindrical roller adjacent an internal corner of the double-tee at an intersection of the deck and a first leg of the at least two legs, the cylindrical roller at least partially supporting the double-tee;
   pivoting the double-tee about the cylindrical roller toward the support structure such that a second leg of the at least two legs moves below the first leg;
   rotating the cylindrical roller relative to the stanchion about a rotational axis while pivoting the double-tee; and
   resting the double-tee on a bearing pad that at least partially supports the double-tee.

2. The method of claim 1, further comprising the act of pivoting the rotational axis of the cylindrical roller relative to the stanchion.

* * * * *